April 19, 1955
J. H. WILSON
2,706,487
RELEASE VALVES
Filed Jan. 4, 1951
2 Sheets-Sheet 1
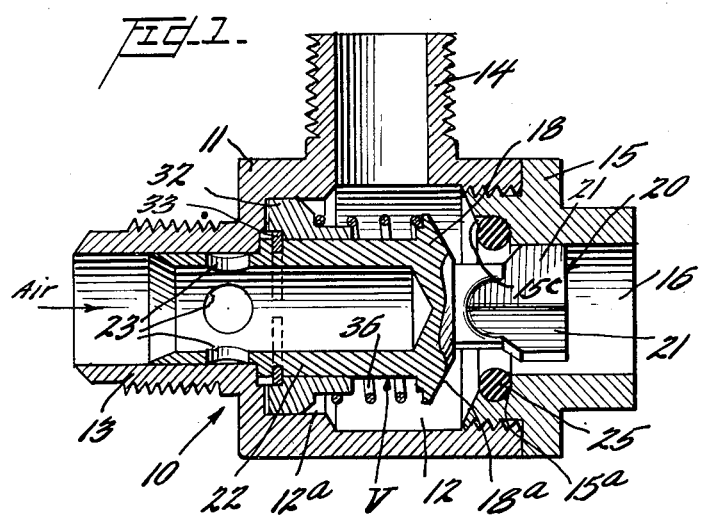
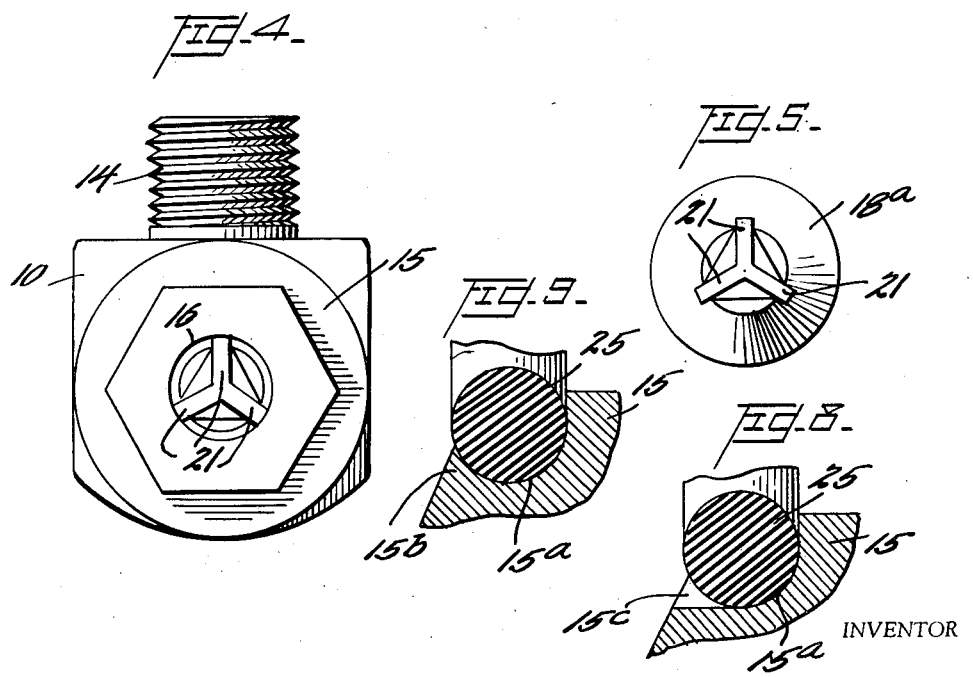
INVENTOR
John Hart Wilson
BY Watson, Cole, Grindle, Watson
ATTORNEYS

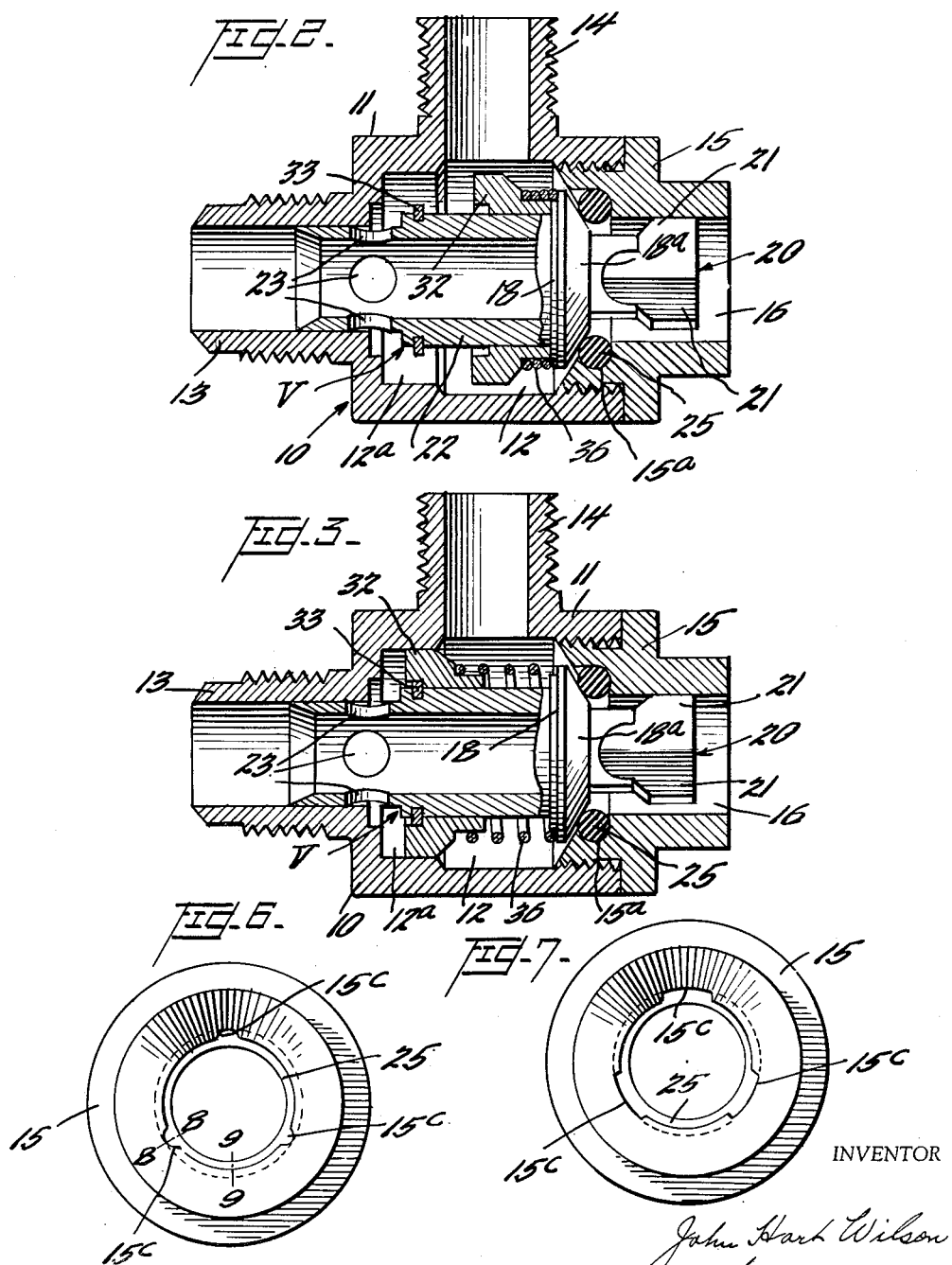

{ # United States Patent Office

2,706,487
Patented Apr. 19, 1955

2,706,487

RELEASE VALVES

John Hart Wilson, Wichita Falls, Tex.

Application January 4, 1951, Serial No. 204,369

10 Claims. (Cl. 137—102)

This invention relates to fluid pressure relief valves of the general type known and in use at this time for effecting the quick release, from the working chamber of an air pressure operated clutch, brake or other device, of the highly compressed body of air which it contains, directly into the atmosphere, when the clutch, brake, or other such instrumentality, is to be released or de-energized. A fluid pressure release valve of the character described is particularly helpful when positioned in close proximity to the air chamber from which highly compressed air is to be discharged and should be constructed in such manner that it can function very quickly, thus greatly speeding up the releasing action of the air operated device with which it is associated by rendering unnecessary the bleeding away of such compressed air through a relatively lengthy air supply line which leads to a distant port, for instance a port formed in the casing of the valve which controls the flow of compressed air from a source of supply, which valve is located where it may be conveniently reached by an operator. These valves must operate in a certain, positive manner and should be durable and rugged in construction since each may be called upon to function many thousands of times during the period of useful life of the machine of which it forms an essential part.

The novel and improved pressure release valve which will hereinafter be described in detail, because of numerous improvements in details of construction, functions more rapidly than any others heretofore known in effecting the venting of an air chamber to the atmosphere, acting almost instantaneously upon decrease of air pressure in the supply line after the operator has brought the air supply line into open communication with the atmosphere. One feature of novelty of the improved release valve consists in an improved relationship of valve and valve seat, the valve member being designed and constructed to seat upon an annular resilient valve seating element which is mounted upon the valve casing and is positioned to encircle the mouth of the exhaust conduit. Heretofore it has generally been thought necessary, where a resilient seating element has been employed in a valve of this general character, to mount such seating element upon the valve itself rather than upon the casing. By mounting the resilient seating ring upon the casing superior functioning is realized and the useful life of the valve seat, and valve assembly, is greatly increased, a factor of considerable importance. Preferably the annular seat is disposed within an annular groove formed in a nut which comprises a removable portion of the valve casing so that the condition of the resilient seating element may be readily determined at anytime by removal of the nut. If replacement or repair is necessary this operation may be quickly effected.

Positioning of the resilient valve seat upon the valve body or casing at the inner end of the air discharge duct, and so as to encircle this duct, involves the utilization of valve seat retaining means of novel character. It will be understood that a resilient ring so located is subjected, when the valve is suddenly opened, to the action of a stream of fluid under high pressure moving toward and into the discharge duct at very high velocity. Because of the pronounced tendency of the outgoing blast to dislodge and carry with it a seating ring so placed it is necessary to construct the ring retaining means in such manner as to neutralize or effectively resist the action of the blast of released high pressure air. In accordance with the present invention such means is provided and the ring, once positioned, will remain where placed until deliberately removed.

In accordance with the invention, likewise, a new and improved means for bringing about the unseating of the valve for quick air release is provided. It has heretofore been proposed that the opening movement of the valve member of a fluid pressure release device may be quickly and positively effected with the aid of a piston of annular form, encircling and slidably mounted upon the valve, and the periphery of which slidably engages the wall of a chamber in the valve body into which compressed air from the supply is discharged.

The piston remains motionless when the air pressure in the conduit which leads to the working chamber is equal to that in the supply line, is advanced when the supply line pressure exceeds that in the working chamber line to permit free air flow from the supply to the working chamber, and is driven in the opposite direction when the pressure in the working chamber line exceeds that in the supply line, carrying the valve with it and thus bringing the working chamber conduit and the air discharge conduit of the device into free communication. Thus sudden release of air pressure in the air inlet conduit, after the working chamber has been charged, unbalances the pressure acting upon the opposite faces of the piston and the confined air under high pressure causes the piston to be driven in such direction as to unseat the valve, the piston in its initial movement engaging a stop on the valve and thereafter drawing the valve with it in its movement. In the improved structure which comprises the subject matter of the present invention a resilient means, specifically a helical spring, encircles the valve member, one end thereof bearing against the valve member and the other bearing against the piston.

Since all movements of the valve member, either toward or away from its seat, result from differences in pressure between the air in the air supply conduit and that in the conduit which leads to the working cylinder, the spring to which reference has been made performs no valve moving function but simply functions to effect relative movement of the valve and piston, positioning the piston, after the pressure in the working cylinder has been fully built up and made equal to that in the air inlet conduit, return flow of air from the working cylinder and conduit leading thereto to the supply line, being thus prevented, as by a non-return valve. This arrangement is one of great simplicity and a spring of very light construction can accomplish the intended function.

In the accompanying drawings one embodiment of the invention is set forth by way of example. It will be appreciated that minor changes in design will not substantially effect changes in function and result and that, within the import of the invention, and in adapting the same to various specific uses, certain changes in structure may be resorted to without departure from the invention.

In the drawings:

Figure 1 is a longitudinal section through valve casing and valve, the valve and piston being shown in the positions which they occupy when there is free communication between the conduit leading to the working chamber and the conduit leading to the atmosphere;

Figure 2 is a similar view showing, however, the valve and piston in the positions which they occupy after air under pressure has been introduced into the air inlet conduit of the valve casing and is passing through the casing into the conduit leading to the working chamber, the valve engaging its seat and sealing off the port leading to the atmosphere and the piston having been moved forwardly of the valve member under the impact of inflowing air, against the resistance of the associated spring;

Figure 3 is a further view of the same character but showing the movable parts of the device in the positions which they occupy after the working chamber of the clutch, brake or the like, has been fully energized and the pressures in the air inlet conduit and conduit leading to the working chamber have been equalized;

Figure 4 is an end elevation of the valve assembly, the port through which air is discharged into the atmosphere being shown;

Figure 5 is an elevation of the valve member, looking at that end which engages the valve seat;

Figure 6 is a front elevational view of the end wall of the chamber through which the valve moves, showing the resilient annular valve seat mounted thereon;

Figure 7 is a similar view, showing a somewhat modified means for holding the valve seat;

Figure 8 is a section on line 8—8 of Figure 6, showing valve seat details; and

Figure 9 is a generally similar view, taken on line 9—9 of Figure 6.

The casing of the fluid pressure release valve is generally indicated at 10 and is formed in two portions, the one piece main portion or body 11 defining a cylindrical chamber the major portion 12 of which is in diameter somewhat larger than a coaxial cylindrical minor portion 12a, the threaded tubular extension 13 defining a conduit through which air under pressure may enter the valve body and the exteriorly threaded lateral tubular extension 14 defining the channel or conduit through which air under pressure may move to and from a working chamber which is not illustrated but which, it will be understood, is associated with the brake, clutch or other member or machine to be actuated. The end of the cylinder 12 remote from tubular extension 13 is partially closed by a cylindrical nut 15, the nut having an exteriorly threaded cylindrical portion the threads of which engage mating threads formed on the body 11 at the end of chamber 12. The nut 15 has formed therein a central cylindrical duct or conduit 16 which functions as an air discharge conduit, its outer end being at all times in free communication with the atmosphere and its inner end being in communication with the chamber 12 of the valve body. The cylindrical air inlet and air outlet ducts defined by conduit 13 and the nut 15 are in axial alignment, although of somewhat different diameter, and comprise not only ducts for the passage of air but likewise guide surfaces for the opposed end portions of the valve, which valve is generally indicated at V.

The valve V may be described as tubular in form and is provided with a head 18 intermediate its ends, having a conical face 18a. Integral with the head 18 is a forward extension 20 comprising three radially extending angularly disposed webs 21 the outer edge surfaces of which are cylindrically curved and slidably engage the cylindrical inner wall of the discharge duct. The cylindrical opposite end 22 of the valve member, which is smaller in outer diameter than the mid-section of the valve but the same in inside diameter, slidably engages the cylindrical inner surface of the air inlet conduit 13 and the valve is thus supported and guided in its reciprocatory movements along a straight line path, by the end extension described.

The reduced cylindrical end 22 of the valve member is provided with a series of apertures 23 which comprise ports through which air under pressure may pass into the valve chamber 12 after the valve has advanced to such extent that these ports are at least partially uncovered by the cylindrical inner wall of the air inlet conduit, i. e. to the position shown in Figure 2 of the drawings, the air passing into the valve chamber 12, of course, immediately entering the conduit 14 leading to the working chamber of the instrumentality to be operated. Movement of the valve from the position in which it is shown in Figure 1 to the position in which it is shown in Figure 2, under the influence of air pressure entering through conduit 13, will, of course, cause the head of the valve to engage the seat which is provided, this seat comprising an annular ring 25 of solid rubber or rubber-like composition disposed in an annular groove or channel formed in nut 15 and encircling the air discharge passage formed in conduit 16, at the inner end of that passage. The groove 15a within which the rubber ring, commonly designated an O-ring, is located, is substantially semicircular in cross section, the ring fitting snugly thereinto as illustrated.

The groove 15a formed in nut 15 is not uniform in cross section at all points. While for most of the distance along its length it is in cross section as it appears in Figure 9, the nut having a valve seat retaining lip 15b which closely supports the seating ring against expansion and against movement axially of and into the chamber 12, the lip 15b is cut away as indicated at 15c in Figure 8 at several places, for instance three places as shown in Figure 6, the openings being of substantial width. The passages 15c are in the nature of channels for the passage of air from the interior of the casing, i. e. from chamber 12 to the area of the channel surface 15a beneath ring 25, and in the reverse direction. The channels may be elongated, as shown in Figure 7, the shape and extent being subject to considerable variation without interference with essential function. It is found that by providing such channels, possibility of the entrapment of air under pressure under the O-ring 25 is wholly avoided, and that the ring remains firmly seated even when the pressure of the air bearing upon its inner surface is very suddenly reduced. In the absence of such ducts or channels, there is substantial likelihood that the O-ring will be sucked from its seat when valve member V is suddenly opened which, of course, renders the device inoperative. By providing air vents in the lip 15b, such as those illustrated, or other channels for venting the areas of the bottom of the groove 15a, all tendency of the O-ring to leave its seat when valve member V suddenly opens, is avoided.

Preferably the O-ring which is selected for assembly with the valve casing has an outer radius which is slightly greater than the radius of the bottom of the groove 15a into which it is to be placed. In order to place such an O-ring in its seat it must first be somewhat distorted and thereafter pressed into position. After insertion its tendency to expand radially will cause it to tightly and snugly engage the curved surface of the groove and hence render dislodgement less likely, even under conditions most favorable to displacement. To insure against dislodgment, however, vents such as those indicated at 15c, or equivalents thereof, are essential.

Encircling the central body of the valve, which is the tubular portion of largest outside diameter, and slidably mounted thereon, is a piston 32 which is free to slide axially of the valve between the snap ring 33 and the annular rear face of the enlarged head 18 of the valve, the annular piston 32 being normally seated against the snap ring 33 by the action of the light-weight, helical spring 36 but being movable from such position by air pressure. The spring 36 will, of course, be compressed when air under heavy pressure is first allowed to enter the valve body through the air inlet conduit 13, as shown in Figure 2, the piston 32 being moved forwardly along the valve member by this air pressure, as has the valve member itself. As soon as the pressure of air in the lateral conduit 14 leading to the working chamber is equal to the pressure of air in the supply conduit 13, there will be no unbalanced force exerted on piston 32 and the spring 36 then becomes effective to force the piston toward the left (Figure 3) until it enters the reduced end portion 12a of the chamber, where the cylindrical side surface of the piston makes rather close sliding contact with the cylindrical wall of this portion of the casing 11, no more than a small amount of air leakage around the piston being possible. With the piston 32 in such position it will be apparent that any substantial lowering of the pressure in the air supply line will bring about an unbalance of forces acting upon the piston since the air pressure existing in the lateral duct 14 remains great. The air pressure in rear of the valve member will, of course, be also lowered. Hence the piston and valve structure will be simultaneously and rapidly moved toward the position in which they are shown in Figure 1, unseating the valve 18 and opening the discharge port to the atmosphere. The stored air escapes to the atmosphere with great speed through the discharge duct 16 and the cycle of operation of the release valve has thus been completed.

Having thus described the invention, what is claimed as new and desired to be secured by Letters Patent is:

1. A fluid pressure release valve comprising a valve body having a valve chamber and a plurality of conduits leading therefrom, one of said conduits being a discharge conduit adapted to transmit fluid under high pressure to the atmosphere, and said body having formed therein at the inner end of said discharge conduit an annular groove for the reception and retention of a valve seat, said groove encircling said discharge conduit and facing inwardly toward the interior of the valve chamber, vents formed in the walls of said groove leading from the bottom thereof to the interior of the valve chamber, an annular resilient valve seat disposed within and closely fitting the wall of said groove, and a valve member supported by said body for movement toward and away from said seat.

2. The combination set forth in claim 1 in which the said groove is substantially semi-circular in cross section and the said vents comprise notches in that wall of the groove which lies between the groove and the valve chamber.

3. A fluid pressure release valve comprising a valve body having a chamber and fluid inlet and discharge conduits communicating therewith, an annular valve seat receiving and retaining groove encircling the fluid discharge conduit at the inner end thereof and facing inwardly toward the interior of said valve chamber, the inner wall of said groove being cut away at spaced points to bring the bottom of said groove into communication with the interior of said chamber, an annular resilient ring closely fitting said groove and projecting outwardly therefrom so as to be engageable by a valve member, and a valve member mounted in said body for movement toward and away from contact with said ring, the ring comprising a seat for said valve member.

4. The combination set forth in claim 3 in which said groove is semi-circular in cross section and said ring is completely circular in cross section.

5. A quick-release fluid pressure controlling valve assembly operable to supply fluid under pressure to a point of use and to exhaust pressure fluid from said point of use to the atmosphere, said assembly comprising, in combination; a valve body having a central fluid chamber, substantially axially aligned fluid inlet and exhaust passageways in opposite ends of said valve body and opening into said chamber, and a fluid outlet passageway in an intermediate portion of said body and providing communication between said point of use and said valve chamber; a valve member mounted in said valve body for axial reciprocation, under pressure from said inlet passageway, from one end position where it closes said inlet passageway to an opposite end position wherein it closes said exhaust passageway thereby placing said inlet passageway and said outlet passageway in communication through the chamber, and for reciprocation from the second named end position toward said first named position wherein said inlet passageway is closed and said exhaust passageway placed in communication with said outlet passageway through the chamber; the end of said body in which said exhaust passageway opens being comprised by a removable closure nut, an annular radially inwardly facing groove surrounding the mouth of said exhaust passageway, an annular resilient valve seat element sprung into said groove and adapted to be contacted in a fluid-tight manner by the valving surface of the exhaust-closing end portion of said valve member; means carried by and movable with respect to said valve element for suddenly unseating said valve element by pressure of fluid entering said chamber from said outlet passageway upon release of pressure in said inlet passageway, thereby venting the chamber and outlet passageway through said exhaust passageway; and notches in a wall of said groove for venting said groove to said chamber and exhaust passageway upon sudden release of pressure in the chamber and the removal of the valve member from said seat element to prevent inadvertent displacement of said seat element.

6. A quick-release fluid pressure controlling valve assembly operable to supply fluid under pressure to a point of use and to exhaust pressure fluid from said point of use to the atmosphere, said assembly comprising, in combination; a valve body having a central fluid chamber, substantially axially aligned fluid inlet and exhaust passageways in opposite ends of said valve body and opening into said chamber, and a fluid outlet passageway in an intermediate portion of said body and providing communication between said point of use and said valve chamber; a substantially cylindrical valve member mounted in said valve body for axial reciprocation, under pressure from said inlet passageway, from one end position where it closes said inlet passageway to an opposite end position wherein it closes said exhaust passageway thereby placing said inlet passageway and said outlet passageway in communication through the chamber, and for reciprocation from the second named end position toward said first named position wherein said inlet passageway is closed and said exhaust passageway placed in communication with said outlet passageway through the chamber; an annular radially inwardly facing groove surrounding the mouth of said exhaust passageway, an annular resilient valve seat element sprung into said groove and adapted to be contacted in a fluid-tight manner by the valving surface of the exhaust-closing end portion of said valve member; means associated with said valve element for suddenly unseating said valve element by back pressure of fluid entering said chamber from said outlet passageway upon release of pressure in said inlet passageway, thereby venting the chamber and outlet passageway through said exhaust passageway; and means for venting said groove to said chamber and exhaust passageway upon sudden release of pressure in the chamber and the removal of the valve member from said seat element to prevent inadvertent displacement of said seat element.

7. A quick-release fluid pressure controlling valve assembly operable to supply fluid under pressure to a point of use and to exhaust pressure fluid from said point of use to the atmosphere, said assembly comprising, in combination; a valve body having a central fluid chamber, substantially axially aligned fluid inlet and exhaust passageways in opposite ends of said valve body and opening into said chamber, and a fluid outlet passageway in an intermediate portion of said body and providing constant communication between said point of use and said valve chamber; an elongated substantially cylindrical valve member mounted in said valve body for axial reciprocation, under pressure from said inlet passageway, from one end position where it closes said inlet passageway to an opposite end position wherein it closes said exhaust passageway thereby placing said inlet passageway and said outlet passageway in communication through the chamber, and for reciprocation from the second named end position toward said first named position wherein said inlet passageway is closed and said exhaust passageway placed in communication with said outlet passageway through the chamber; the end of said body in which said exhaust passageway opens being comprised by a removable closure nut, an annular radially inwardly facing groove surrounding the mouth of said exhaust passageway, a toroidal resilient valve seat element sprung into said groove and adapted to be contacted in a fluid-tight manner by the valving surface of the exhaust-closing end portion of said valve member; and means associated with said valve element for unseating said valve element by pressure of fluid entering said chamber from said outlet passageway upon release of pressure in said inlet passageway, thereby venting the chamber and outlet passageway through said exhaust passageway.

8. A quick-release fluid pressure controlling valve assembly operable to supply fluid under pressure to a point of use and to exhaust pressure fluid from said point of use to the atmosphere, said assembly comprising, in combination; a valve body having a central fluid chamber, substantially axially aligned fluid inlet and exhaust passageways in opposite ends of said valve body and opening into said chamber, and a fluid outlet passageway in an intermediate portion of said body and providing communication between said point of use and said valve chamber; a valve member mounted in said valve body for axial reciprocation, under pressure from said inlet passageway, from one end position where it closes said inlet passageway to an opposite end position wherein it closes said exhaust passageway thereby placing said inlet passageway and said outlet passageway in communication through the chamber, and for reciprocation from the second named end position toward said first named position wherein said inlet passageway is closed and said exhaust passageway placed in communication with said outlet passageway through the chamber; means associated with said valve element for unseating said valve element by back pressure of fluid entering said chamber from said outlet passageway upon release of pressure in said inlet passageway, thereby venting the chamber and outlet passageway through said exhaust passageway, said last named means comprising an annular piston encircling and slidably mounted upon said valve member, an annular recess in the said chamber surrounding said valve member and formed in the wall of the chamber between the main portion thereof and the mouth of the inlet passageway, the periphery of said piston adapted to slidably engage the wall of said chamber within said recess to cut off flow between said chamber and said inlet passageway upon reduction of inlet pressure below that maintained in the chamber and outlet passageway; a spring stop on said valve member spaced from said piston in the direction away from said inlet passageway, and a spring disposed between said spring stop and said piston to urge the latter toward closed position.

9. The valve assembly as set forth in claim 8, wherein said valve member has a mush-room head at the exhaust closing end thereof adapted to close the exhaust passageway, said head also comprising the said spring stop, and said spring being a coil spring surrounding the valve member.

10. A quick-release fluid pressure controlling valve assembly operable to supply fluid under pressure to a point of use and to exhaust pressure fluid from said point of use to the atmosphere, said assembly comprising, in combination; a valve body having a central fluid chamber, substantially axially aligned fluid inlet and exhaust passageways in opposite ends of said valve body and opening into said chamber, and a fluid outlet passageway in an intermediate portion of said body and providing communication between said point of use and said valve chamber; a valve member mounted in said valve body for axial reciprocation, under pressure from said inlet passageway, from one end position where it closes said inlet passageway to an opposite end position wherein it closes said exhaust passageway thereby placing said inlet passageway and said outlet passageway in communication through the chamber, and for reciprocation from the second named end position toward said first named position wherein said inlet passageway is closed and said exhaust passageway placed in communication with said outlet passageway through the chamber; means associated with said valve element for unseating said valve element by back pressure of fluid entering said chamber from said outlet passageway upon release of pressure in said inlet passageway, thereby venting the chamber and outlet passageway through said exhaust passageway, said last named means comprising an annular piston encircling and slidably mounted upon said valve member, an annular recess in the said chamber surrounding said valve member and formed in the wall of the chamber between the main portion thereof and the mouth of the inlet passageway, the periphery of said piston adapted to slidably engage the wall of said chamber within said recess to cut off flow between said chamber and said inlet passageway upon reduction of inlet pressure below that maintained in the chamber and outlet passageway; a stop abutment on said valve member for limiting the sliding movement of said piston thereon in the direction of said fluid inlet passageway, a spring stop on said valve member spaced from said piston in the direction away from said inlet passageway, and a spring disposed between said spring stop and said piston to urge the latter toward said stop abutment, said stop abutment being positioned to locate the piston with its periphery in sliding engagement with the wall of said recess when the valve member is positioned to close the outlet passageway.

References Cited in the file of this patent

UNITED STATES PATENTS

| | | |
|---|---|---|
| 1,697,352 | Ferris | Jan. 1, 1929 |
| 2,002,672 | Melott | May 28, 1935 |
| 2,252,923 | Granetz | Aug. 19, 1941 |
| 2,371,293 | Hoof | Mar. 13, 1945 |
| 2,385,733 | Schroer | Sept. 25, 1945 |
| 2,393,076 | Van Der Werff | Jan. 15, 1946 |
| 2,513,976 | Weatherhead | July 4, 1950 |
| 2,574,851 | Wagner | Nov. 13, 1951 |